US008729331B2

(12) United States Patent
Coelho Tsou et al.

(10) Patent No.: US 8,729,331 B2
(45) Date of Patent: *May 20, 2014

(54) METHOD FOR ELECTROCHEMICALLY REMOVING HYDROGEN FROM A REACTION MIXTURE

(75) Inventors: Joana Coelho Tsou, Heidelberg (DE); Alexander Panchenko, Ludwigshafen (DE); Annebart Engbert Wentink, Mannheim (DE); Sebastian Ahrens, Wiesloch (DE); Thomas Heidemann, Viernheim (DE); Guenther Huber, Ludwigshafen (DE); Albena Kostova, Mannheim (DE)

(73) Assignee: BASF SE, Ludwigshafen (DE)

( * ) Notice: Subject to any disclaimer, the term of this patent is extended or adjusted under 35 U.S.C. 154(b) by 124 days.

This patent is subject to a terminal disclaimer.

(21) Appl. No.: 13/259,863

(22) PCT Filed: Mar. 29, 2010

(86) PCT No.: PCT/EP2010/054117
§ 371 (c)(1),
(2), (4) Date: Sep. 23, 2011

(87) PCT Pub. No.: WO2010/115761
PCT Pub. Date: Oct. 14, 2010

(65) Prior Publication Data
US 2012/0012471 A1 Jan. 19, 2012

(30) Foreign Application Priority Data
Apr. 6, 2009 (EP) .................................. 09157394

(51) Int. Cl.
C07C 7/144 (2006.01)
(52) U.S. Cl.
USPC ......................................................... 585/818
(58) Field of Classification Search
None
See application file for complete search history.

(56) References Cited

U.S. PATENT DOCUMENTS

| 7,019,184 | B2 | 3/2006 | Allison et al. |
| 2007/0215461 | A1* | 9/2007 | Zuber et al. .................... 204/280 |
| 2011/0003071 | A1 | 1/2011 | Uensal et al. |
| 2011/0108432 | A1 | 5/2011 | Malkowsky et al. |
| 2011/0124933 | A1 | 5/2011 | Kiesslich et al. |
| 2011/0130606 | A1 | 6/2011 | Kiesslich et al. |

FOREIGN PATENT DOCUMENTS

| GB | 1 179 033 | 1/1970 |
| JP | 2004-307248 A | 11/2004 |
| JP | 2005-48247 A | 2/2005 |
| JP | 2005-243603 A | 9/2005 |
| JP | 2005-298307 A | 10/2005 |
| WO | 03 084905 | 10/2003 |
| WO | 2009 109512 | 9/2009 |
| WO | 2009 124902 | 10/2009 |
| WO | 2009 124960 | 10/2009 |
| WO | 2009 141366 | 11/2009 |
| WO | 2010 000600 | 1/2010 |
| WO | 2010 115747 | 10/2010 |
| WO | 2010 115765 | 10/2010 |
| WO | 2010 115768 | 10/2010 |

OTHER PUBLICATIONS

Wang, D., et al., "Characterization of a Mo/ZSM-5 Catalyst for the Conversion of Methane to Benzene," Journal of Catalysis, vol. 169, pp. 347-358, (1997).
Stookey, D. J., "Membranes: Gas-Separation Applications," Ullmann's Encyclopedia of Industrial Chemistry, pp. 1-12, (2005).
Ibeh, B., et al., "Separation of hydrogen from a hydrogen/methane mixture using a PEM fuel cell," International Journal of Hydrogen Energy, vol. 32, pp. 908-914, (2007).
International Search Report Issued Sep. 6, 2010 in PCT/EP10/054117 Filed Mar. 29, 2010.
U.S. Appl. No. 13/202,427, filed Aug. 19, 2011, Coelho Tsou, et al.
U.S. Appl. No. 13/260,053, filed Sep. 23, 2011, Coelho Tsou, et al.
U.S. Appl. No. 13/256,536, filed Sep. 14, 2011, Tsou, et al.
U.S. Appl. No. 13/186,592, filed Jul. 20, 2011, Schneider, et al.
U.S. Appl. No. 13/383,014, filed Jan. 9, 2012, Kubanek, et al.
U.S. Appl. No. 13/383,321, filed Jan. 10, 2012, Kubanek, et al.
U.S. Appl. No. 13/393,837, filed Mar. 2, 2012, Schneider, et al.
Office Action issued May 27, 2013 in Japanese Patent Application No. 2012-503964 submitting English translation only.

* cited by examiner

Primary Examiner — Tam M Nguyen
(74) Attorney, Agent, or Firm — Oblon, Spivak, McClelland, Maier & Neustadt, L.L.P.

(57) ABSTRACT

The invention relates to a process for the electrochemical separation of hydrogen from a hydrogen-comprising reaction mixture R by means of a gastight membrane-electrode assembly comprising at least one selectively proton-conducting membrane and at least one electrode catalyst on each side of the membrane, where at least part of the hydrogen present in the reaction mixture R is oxidized to protons over the anode catalyst on the retentate side of the membrane and the protons are, after passing through the membrane to the permeate side, I reduced to hydrogen over the cathode catalyst and/or II reacted with oxygen over the cathode catalyst to form water, with the oxygen originating from an oxygen-comprising stream O which is brought into contact with the permeate side of the membrane, and also a reactor equipped with at least one membrane-electrode assembly.

19 Claims, No Drawings

METHOD FOR ELECTROCHEMICALLY REMOVING HYDROGEN FROM A REACTION MIXTURE

This application is a 371 of PCT/EP10/54117, filed Mar. 29, 2010. Priority to European patent application 09157394.9, filed Apr. 6, 2009, is claimed.

The present invention relates to a process for the electrochemical separation of hydrogen from a reaction mixture by means of a gastight membrane-electrode assembly comprising at least one selectively proton-conducting membrane and at least one electrode catalyst on each side of the membrane, and also a reactor equipped with at least one membrane-electrode assembly.

Many chemical reactions form reaction mixtures in which hydrogen is obtained as by-product. In many cases, it is necessary to remove the hydrogen from the reaction mixture. For example, the hydrogen can unfavorably influence the position of the reaction equilibrium and thus lead to unsatisfactory yields of the desired product. Furthermore, the hydrogen in the reaction mixture can make the further use of the product difficult. In addition, the hydrogen represents a valuable component of the reaction mixture.

An example of a chemical reaction in which a reaction mixture comprising hydrogen as by-product is formed is the conversion of aliphatics into aromatics under nonoxidative conditions. This is referred to as nonoxidative dehydroaromatization (DHAM). The dehydrogenative cyclization forms aromatic hydrocarbons and hydrogen from aliphatics. For example, 1 mol of benzene and 9 mol of hydrogen are formed from 6 mol of methane.

DHAM is also an example of a reaction in which the hydrogen formed influences the reaction equilibrium in an undesirable way. The more hydrogen present in the reaction mixture, the less methane is converted into benzene. Examination of the thermodynamics shows that the reaction in the DHAM of methane is limited by the position of the equilibrium (D. Wang, J. H. Lunsford and M. P. Rosynek, "Characterization of a Mo/ZSM-5 catalyst for the conversion of methane to benzene", Journal of Catalysis 169, 347-358 (1997)). Calculations for the components methane, benzene, naphthalene and hydrogen show that the equilibrium conversions for the isothermal conversion of methane into benzene (and naphthalene) decrease with increasing pressure and decreasing temperature; for example, the equilibrium conversion at 1 bar and 750° C. is about 17%. Removal of hydrogen from the reaction mixture can increase the conversion.

The separation of hydrogen from the reaction mixture is often associated with a high outlay in terms of apparatus and a high energy consumption.

A process for the DHAM of hydrocarbons, in particular natural gas, with separation of the $H_2$ and the aromatic hydrocarbons from the product gas and recirculation of the remaining product gas to the reaction zone or the renewed reaction of the product gas after removal of the hydrogen and without prior removal of the aromatic hydrocarbons in a further reaction stage is described in U.S. Pat. No. 7,019,184 B2. As methods for separating off the $H_2$, mention is made of hydrogen-selective membranes and pressure swing adsorption. The hydrogen which has been separated off can be used for energy generation, for example in a combustion chamber or in a fuel cell.

In the removal of hydrogen by means of a selectively hydrogen-permeable membrane, the hydrogen migrates as $H_2$ molecules through the membrane. The membrane usually comprises Pd sheet or porous polymers. The diffusion rate depends on the partial pressure difference of hydrogen between retentate side and permeate side of the membrane. This can in principle be influenced by three different methods: 1) compression of the feed gas, as a result of which the partial pressure is increased, 2) generation of a vacuum on the permeate side or 3) use of sweep gas on the permeate side, which reduces the partial pressure of hydrogen. These methods are either mechanically demanding (options 1) and 2)) or require separation of the sweep gas from the hydrogen. In order to achieve higher diffusion rates, it is therefore necessary to work at higher pressure differences which place high demands on the mechanical stability of the membrane; in addition, the appropriate apparatuses for compression and expansion of the gas mixture have to be present. For kinetic reasons, a certain proportion of the hydrogen always remains in the retentate. For example, the permeate obtained from an $H_2/CH_4$ mixture by means of a hydrogen-permeable polymer membrane usually comprises 1 molecule of $CH_4$ per 10 molecules of $H_2$. In the case of a Pd membrane, which becomes selectively hydrogen-permeable above about 200° C. and reaches its optimal separation performance at 400° C.-500° C., the permeate usually comprises 1 molecule of $CH_4$ per 200 molecules of $H_2$.

In pressure swing adsorption, an adsorbent is supplied cyclically in a first phase with the hydrogen-comprising stream, with all components apart from hydrogen being retained by adsorption. In a second phase, these components are desorbed again by means of reduced pressure. This is a technically very complicated process in which adsorbents have to be used and a hydrogen-comprising waste stream whose hydrogen content can be more than 40% is formed, see Ullmann's Encyclopedia of Industrial Chemistry, "Membranes: Gas Separation-Applications", D. B. Strooky, Elah Strategies, page 6, Chesterfield, Mo., USA, 2005 Wiley-VCH Verlag, Weinheim.

Apart from pressure swing adsorption and the use of selectively hydrogen-permeable membranes, the use of a "cold box" is also a customary method of separating hydrogen from gas mixtures.

In the removal of hydrogen by means of a cold box, the gas mixture is cooled to a temperature in the range from about −150° C. to −190° C. under pressures of from 30 to 50 bar. Generation of these low temperatures is costly. If the mixture which has in this way been freed of hydrogen is to be reused in a reaction, it has to be reheated to the appropriate reaction temperature, for example to 600-1000° C. for dehydroaromatization.

The separation of hydrogen from a mixture of hydrogen and methane is described by B. Ibeh et al. (International Journal of Hydrogen Energy 32 (2007), pages 908-914). The starting point of these authors was to examine the suitability of natural gas as carrier gas for the transport of hydrogen through the existing infrastructure for natural gas transport, with the hydrogen having to be separated off again from the natural gas after joint transport of the two. B. Ibeh et al. used a fuel cell having a single proton-exchange membrane and Pt or Pt/Ru anode electrocatalysts for separating the hydrogen from hydrogen/methane mixtures. The fuel cell was supplied with hydrogen/methane mixtures at atmospheric pressure and temperatures in the range from 20 to 70° C.

Neither pressure swing adsorption nor the cold box are suitable for separating hydrogen from a reaction mixture while the reaction is occurring.

It is therefore an object of the present invention to provide a process for the separation of hydrogen from a hydrogen-comprising reaction mixture, which avoids the disadvantages of the processes for the removal of hydrogen which are known from the prior art. In particular, it should be made possible to remove the hydrogen directly from the reaction zone in order to be able to influence the position of the reaction equilibrium in hydrogen-forming reactions. The process should help to make efficient use of the starting materials used in the reaction and the hydrogen present in the reaction mixture. In addition, it should have a very favorable energy balance and require a low outlay in terms of apparatus.

The object is achieved by a process for the electrochemical separation of hydrogen from a hydrogen-comprising reaction mixture R by means of a gastight membrane-electrode assembly comprising at least one selectively proton-conducting membrane and at least one electrode catalyst on each side of the membrane, where at least part of the hydrogen present in the reaction mixture R is oxidized to protons over the anode catalyst on the retentate side of the membrane and the protons are, after passing through the membrane to the permeate side, I reduced to hydrogen over the cathode catalyst and/or II reacted with oxygen over the cathode catalyst to form water, with the oxygen originating from an oxygen-comprising stream O which is brought into contact with the permeate side of the membrane.

Compared to the processes described in the prior art, the process of the invention has the advantage that the hydrogen is separated electrochemically from the hydrogen-comprising reaction mixture R. The driving force for the removal of hydrogen is based either on the potential difference between the two sides of the selectively proton-permeable membrane (alternative I) or on the negative free enthalpy of the reaction of hydrogen and oxygen to form water (alternative II).

The use of selectively proton-conducting membranes enables the process to be operated largely independently of pressure differences which are necessary when using membranes which are selectively permeable to hydrogen molecules. The hydrogen removal can therefore be carried out at lower pressures and pressure differences, and an externally applied pressure difference is preferably dispensed with entirely. This significantly reduces the mechanical stress on the membrane, which leads to an increase in its long-term stability. In addition, the choice of possible materials for the membrane is increased.

The opportunity of separating the hydrogen from the reaction mixture at lower pressures additionally saves separation processes which are complicated in terms of apparatus, as are necessary in pressure swing adsorption or in the use of a cold box.

In addition, the process of the invention has an improved energy balance since energy-intensive temperature changes such as cooling and heating cycles are avoided. The removal of the hydrogen from the reaction mixture in equilibrium reactions such as DHAM can also lead to a shift in the equilibrium in the direction of the desired product and thus to higher yields.

Compared to the removal of hydrogen by means of a hydrogen-selective membrane, the electrochemical removal of hydrogen is significantly more effective. The membrane area required can therefore be reduced or significantly more hydrogen can be separated off from the reaction mixture at a given membrane area. The amount of hydrogen remaining in the reaction mixture after the separation is significantly lower than in the case of removal by means of a hydrogen-selective membrane.

If the process of the invention is operated according to alternative I, very pure hydrogen is obtained in the process. Very pure hydrogen can be used in many further reactions or processes which are sensitive to impurities and thus represents a valuable by-product.

If the process of the invention is operated according to alternative II, electric energy and heat are liberated in the process. This energy can be utilized for operation of the process of the invention. This achieves a further improvement in the energy balance of the process of the invention.

Depending on the mode of operation, the user then has control over whether more or exclusively hydrogen or more or exclusively electric energy and heat are obtained in the process; in particular, the electric energy required for removal of the hydrogen according to alternative I can be provided by the simultaneous removal of hydrogen according to alternative II.

The invention is illustrated in detail below.

According to the invention, at least part of the hydrogen comprised in the reaction mixture R is separated off electrochemically by means of a gastight membrane-electrode assembly, with the hydrogen to be separated off being transported in the form of protons through the membrane. For the purposes of the present invention, a membrane-electrode assembly (MEA) is the electrodes together with the membrane arranged between them. According to the invention, the gastight MEA comprises at least one selectively proton-conducting membrane.

The product stream P is conveyed along one side of the membrane. This side will hereinafter be referred to as the retentate side. The other side of the membrane will hereinafter be referred to as the permeate side. On the retentate side, the hydrogen formed according to alternative I and/or the water formed according to alternative II is discharged. The membrane has at least one electrode catalyst on each side; in the present description, the electrode catalyst located on the retentate side will be referred to as anode catalyst and the electrode catalyst located on the permeate side will be referred to as cathode catalyst. On the retentate side, the hydrogen is oxidized to protons over the anode catalyst, these protons pass through the membrane and on the permeate side are reduced to hydrogen over the cathode catalyst (alternative I) or reacted with oxygen over the cathode catalyst to form water (alternative II). According to alternative II, an oxygen-comprising stream O is for this purpose conveyed along the permeate side and brought into contact with the membrane. In the case of alternative I, electric energy has to be expended for transport of the protons through the membrane and this is supplied by application of a DC voltage to the two sides of the membrane by means of electrodes. In alternative II, energy is produced.

For the purposes of the present invention, a reaction mixture is a mixture obtained by means of a chemical reaction. A chemical reaction is a reaction in which one or more product compound(s) are produced from one or more chemical starting compound(s). Mixtures which are obtained merely by physical mixing without a chemical reaction are not reaction mixtures for the purposes of the present invention. Naturally occurring mixtures such as natural gas are also not reaction mixtures for the purposes of the present invention.

In a preferred embodiment, the reaction mixtures are used directly. In this context, "directly" means that the reaction mixture is used in the process of the invention in the form in which it is obtained, without purification or work-up.

Preference is given to using a reaction mixture R which originates from a hydrogen-forming reaction. Further preference is given to the hydrogen being removed directly from the reaction zone in which the reaction mixture R is formed.

The hydrogen is particularly preferably removed from the reaction zone while the reaction leading to the reaction mixture R is taking place.

The hydrogen obtained according to alternative I has a high purity. It can be collected and sold or used for energy generation. Owing to the high purity, the hydrogen can also be used in further chemical reactions or processes which are sensitive to impurities. In the process according to alternative II, heat and electric energy are liberated. The heat can, for example, be used for heating the reaction in which the reaction mixture R is formed.

To ensure good contact of the membrane with the hydrogen present on the retentate side and good outward transport of the hydrogen which has been separated off or the water on the permeate side, the electrode layers are usually provided with gas diffusion layers. These are, for example, plates having a grid-like surface structure of a system of fine channels or layers of porous material such as nonwoven, woven fabric or paper. The totality of gas diffusion layer and electrode layer is generally referred to as gas diffusion electrode (GDE). The gas diffusion layer conveys the hydrogen to be separated off to close to the membrane and the anode catalyst on the retentate side and aids the outward transport of the hydrogen or water formed on the permeate side.

The MEA used according to the invention is gastight, i.e. it has virtually no porosity through which gases in atomic or molecular form can get from one side to the other side of the MEA nor does it have mechanisms by means of which gases can be transported unselectively through the MEA, for example by adsorption, dissolution in the membrane, diffusion and desorption.

The impermeability of the membrane-electrode assembly (MEA) can be ensured by a gastight membrane, by a gastight electrode and/or a gastight electrode catalyst. Thus, for example, a thin metal foil, for example a Pd, Pd—Ag or Pd—Cu foil, can be used as gastight electrode.

The membrane used according to the invention selectively conducts protons, which means, in particular, that it is not an electron conductor. In the process of the invention, it is in principle possible to use all materials which are used in the prior art as membrane material for fuel cells (Standard SOFC (Solid Oxide Fuel Cell)) as proton-conducting membrane.

Suitable proton-conducting ceramics are described, for example, in Solid State Ionics 125, (1999), 271-278; Journal of Power Sources 180, (2008), 15-22; Ionics 12, (2006), 103-115; Journal of Power Sources 179 (2008) 92-95; Journal of Power Sources 176 (2008) 122-127 and Electrochemistry Communications 10 (2008) 1005-1007.

Examples of proton-conducting ceramics are $SrCeO_3$, $BaCeO_3$, $Yb:SrCeO_3$, $Nd:BaCeO_3$, $Gd:BaCeO_3$, $Sm:BaCeO_3$, $BaCaNdO_9$, $Y:BaCeO_3$, $Y:BaZrCeO_3$, Pr-doped $Y:BaCeO_3$, $Gd:BaCeO_3$, $BaCe_{0.9}Y_{0.1}O_{2.95}$ (BYC), $SrCe_{0.95}Yb_{0.05}O_{3-\alpha}$, $_{BaCe}0.9Nd_{0.10}O_{3-\alpha}$, $CaZr_{0.96}In_{0.04}O_{3-\alpha}$, ($\alpha$ denotes the number of oxygen vacancies per formula unit of the oxide of the perovskite type); Sr-doped $La_3P_3O_9$, Sr-doped $LaPO_4$, $BaCe_{0.9}Y_{0.1}O_{3-\alpha}$ (BCY), $BaZr_{0.9}Y_{0.1}O_{3-\alpha}$ (BZY), $Ba_3Ca_{1.18}Nb_{1.82}O_{8.73}$ (BCN18), $(La_{1.95}Ca_{0.05})Zr_2O_{7-\alpha}$, $La_2Ce_2O_7$, $Eu_2Zr_2O_7$, $H_2S/(B_2S_3$ or $Ga_2S_3)/GeS_2$, $SiS_2$, $As_2S_3$ or $CsI$; $BaCe_{0.8}Gd_{0.2}O_{3-\alpha}$ (BCGO); Gd-doped $BaCeO_3$ such as $BaCe_{0.85}Y_{0.15}O_{3-\alpha}$ (BCY15) and $BaCe_{0.8}Sm_{0.2}O_{3-\alpha}$, $xAl_2O_3$ $(1-x)SiO_2$, $SnP_2O_7$, $Sn_{1-x}In_xP_2O_7$ (x=0.0-0.2).

Suitable materials for forming anode and cathode are described, for example, in Journal of Power Sources 180, (2008), 15-22.

To produce an anode for the process of the invention, it is possible to use all materials which are used in the prior art as anode materials for fuel cells (Standard SOFC (Solid Oxide Fuel Cell)). Suitable materials for forming an anode are, for example, Ni, Pd, Pt, Ag, Cu, Fe, Cr, Ti, V, Mn, Au, Mo, molybdenum carbide, W, tungsten carbide, Re, Ru, Co, Zr, Rh, Ir, Y, Nb, electrically conductive forms of carbon such as carbon black, graphite and nanotubes and also mixtures and alloys of these elements. Further suitable materials are, for example, Pt/Ni alloys, Pd-laden iron oxides such as FeO, Pr-doped $Y:BaCeO_3$, $BaCeYO_3$, $Ni$—$BaCeSmO_3$, $Ni$—$BaCeGdO_3$ and $Ni$—$BaCeNdO_3$.

To form a cathode for the process of the invention, it is possible to use all materials which are used in the prior art as cathode materials for fuel cells (Standard SOFC (Solid Oxide Fuel Cell)). Suitable materials for forming a cathode are, for example, Ni, Pd, Pt, Ag, Cu, Fe, Cr, Ti, V, Mn, Au, Mo, molybdenum carbide, W, tungsten carbide, Re, Ru, Co, Zr, Rh, Ir, Y, Nb, electrically conductive forms of carbon such as carbon black, graphite and nanotubes and also mixtures and alloys of these elements. Further suitable materials are, for example, $BaCePrYO_3$, $BaPrCoO_3$, $BaPrYO_3$, $LaCaFeCoO_3$, $BaSrCoFeO_3+BaCeSmO_3$, $LaSrCoO_3+BaCeGdO_3$ and $LaSrCoO_3+BaCeNdO_3$.

The abovementioned anode and cathode materials can be combined in any way. Suitable combinations of anode and cathode for forming a membrane-electrode unit (anode/cathode) are, for example, Pt/Pt, Ni/Ni, Pd/Pd, Cu/Cu, Ag/Ag, Fe/Fe, Cr/Cr, Ti/Ti, V/V, Mn/Mn, Au/Au, Pt/Pd, Pd/Pt, Ni/Pt, Pt/Ag, Pd-laden $FeO/BaPrCoO_3$, Pr-doped $Y:BaCeO_3/BaPrYO_3$, $Pt/LaCaFeCOO_3$, $BaCeYO_3/Pt$, $Ni$—$BaCeSmO_3/BaSrCoFeO_3+BaCeSmO_3$, $Ni$—$BaCeGdO_3/LaSrCoO_3+BaCeGdO_3$, $Ni/BaCePrYO_3$, $Ni$—$BaCeNdO_3/LaSrCoO_3+BaCeNdO_3$ and $Ba_{0.5}Sr_{0.5}Co_{0.8}O_{3-\alpha}$ (BSCFO) either alone or in admixture with $Gd_{0.2}Ce_{0.8}O_{1.9}$.

In a preferred embodiment, the membrane-electrode unit (anode/cathode) comprises a proton-conducting ceramic or an oxide from the group consisting of $SrCeO_3$, $BaCeO_3$, $Yb:SrCeO_3$, $Nd:BaCeO_3$, $Gd:BaCeO_3$, $Sm:BaCeO_3$, $BaCaNdO_9$, $Y:BaCeO_3$, $Y:BaZrCeO_3$, Pr-doped $Y:BaCeO_3$, $Gd:BaCeO_3$, $BaCe_{0.9}Y_{0.1}O_{2.95}$ (BYC), $SrCe_{0.95}Yb_{0.05}O_{3-\alpha}$, $_{BaCe}0.9Nd_{0.10}O_{3-\alpha}$, $CaZr_{0.96}In_{0.04}O_3$; Sr-doped $La_3P_3O_9$, Sr-doped $LaPO_4$, $BaCe_{0.9}Y_{0.1}O_{3-\alpha}$, (BCY), $BaZr_{0.9}Y_{0.1}O_{3-\alpha}$ (BZY), $Ba_3Ca_{1.18}Nb_{1.82}O_{8.73}$ (BCN18), $(La_{1.95}Ca_{0.05})Zr_2O_{7-\alpha}$, $La_2Ce_2O_7$, $Eu_2Zr_2O_7$, $H_2S/(B_2S_3$ or $Ga_2S_3)/GeS_2$, $SiS_2$, $As_2S_3$ or $CsI$; $BaCe_{0.8}Gd_{0.2}O_{3-\alpha}$ (BCGO); Gd-doped $BaCeO_3$ such as $BaCe_{0.85}Y_{0.15}O_{3-\alpha}$ (BCY15) and $BaCe_{0.8}Sm_{0.2}O_{3-\alpha}$ or mixtures of the abovementioned materials as membrane and the anode/cathode combination Pt/Pt, Ni/Ni, Pd/Pd, Pt/Ni, Pt/Pd, Ni/Pt, Ni/Pd, Pd/Pt or Pd/Ni.

In a preferred embodiment of the present invention, the separation of the hydrogen from the reaction mixture R is carried out in a reactor which is equipped with at least one MEA, so that the reaction zone is located on the retentate side of the membrane or forms the retentate side. This can be carried out, for example, in a reactor whose outer walls are formed at least partly by MEAs. The reactors equipped with at least one MEA for the removal of the hydrogen are likewise provided by the present invention.

A description of reactor types which may be used by modification with at least one MEA in the process according to the invention can be found in "Catalytica® Studies Division, Oxidative Dehydrogenation and Alternative Dehydrogenation Processes" (Study Number 4192 OD, 1993, 430 Ferguson Drive, Mountain View, Calif., 94043-5272, USA).

Suitable reactor types are fluidized-bed reactors, circulating fluidized-bed reactors, fixed-bed reactors, fixed-bed tube reactors and shell-and-tube reactors. In the case of fixed-bed tube reactors and shell-and-tube reactors, the catalyst is present as a fixed bed in a reaction tube or in a bundle of reaction tubes, with the outer wall of the reactor comprising at least one MEA. Customary internal diameters of the reaction tube are from about 10 to 15 cm. A typical shell-and-tube reactor for dehydrogenative aromatization comprises from about 300 to 1000 reaction tubes.

In an embodiment of the process of the invention, the individual reaction tubes also each comprise at least one MEA, so that continuous transport of hydrogen from the reaction tubes to the outer wall of the reactor is ensured.

The reaction leading to the reaction mixture R can also be carried out in the presence of a heterogeneous catalyst in a fluidized bed or in a circulating fluidized bed, with the outer wall of the reactor preferably comprising at least one MEA.

The reaction leading to the reaction mixture can also be carried out in a tray reactor, with the outer wall of the reactor comprising at least one MEA according to a preferred embodiment. The reactor comprises one or more successive catalyst beds. The reaction gas preferably flows radially or axially through the catalyst beds. In general, such a tray reactor is operated using one fixed catalyst bed. In the simplest case, the fixed catalyst beds are arranged axially or in the annular gaps between concentric cylindrical meshes in a shaft furnace reactor. A shaft furnace reactor corresponds to a tray reactor having only one tray.

The removal of the hydrogen can be carried out at temperatures of from 200 to 1200° C., preferably from 500 to 1100° C., particularly preferably from 600 to 1000° C.

The removal of the hydrogen is preferably carried out at pressures of from 0.5 to 10 bar, more preferably from 1 to 6 bar, particularly preferably from 1 to 4 bar. In a preferred embodiment of the invention, the pressure difference between the retentate side and the permeate side of the membrane is less than 1 bar, preferably less than 0.5 bar, and there is particularly preferably no pressure difference.

The removal of the hydrogen according to alternative I is, according to the invention, carried out at voltages of from 0.05 to 2000 mV, preferably from 100 to 1500 mV, particularly preferably from 100 to 900 mV and very particularly preferably from 100 to 800 mV, relative to an HRE (hydrogen reference electrode).

The oxygen-comprising stream which is used according to alternative II comprises, according to the invention, at least 15 mol %, preferably at least 20 mol %, of oxygen. In a preferred embodiment, air or oxygen-enriched air is used as oxygen-comprising stream O. The air is usually used in unpurified form.

The flow rate of the stream O is selected so that the amount of $O_2$ is stoichiometrically from 1 to 10 times, preferably from 1.2 to 5 times and particularly preferably from 1.5 to 2.5 times, the amount of $H_2$.

According to the invention, at least part of the hydrogen comprised in the reaction mixture R is separated off. Preference is given to separating off at least 30%, particularly preferably at least 50%, particularly preferably at least 70% and very particularly preferably at least 95%, in particular at least 98%.

The hydrogen obtained on the permeate side according to alternative I comprises usually not more than 5 mol %, preferably not more than 2 mol % and particularly preferably not more than 1 mol %, of compounds other than hydrogen.

The hydrogen can, according to the invention, be separated off according to alternative I, according to alternative II or according to both alternatives. The latter means that at least part of the hydrogen is obtained as hydrogen and at least part of the hydrogen is obtained as water with generation of electric energy. The amount of the hydrogen comprised in the product stream P which is separated off according to each of the alternatives I and II can be selected by the user in accordance with demand. In a preferred embodiment of the invention, the hydrogen is separated off according to both alternative I and alternative II and the amount of hydrogen separated off according to II is at least so much that the stream produced is sufficient to cover the energy requirements for the removal of hydrogen according to alternative I.

When the hydrogen is separated off from the reaction mixture R according to both of the alternatives I and II, this is preferably carried out physically separately since when oxygen is present on the permeate side the protons usually react directly to form hydrogen. The reaction mixture can, for example, be conveyed firstly along an MEA which is in contact with a stream O on the permeate side, so that part of the hydrogen is separated off as water. The reaction mixture R is subsequently conveyed along an MEA to which a voltage is applied so that the hydrogen is separated off as hydrogen. The physical separation between the two alternatives I and II can also be achieved by the product stream P being conveyed between two membranes, for example membranes opposite one another, of which one is in contact with a stream O on the permeate side and a voltage is applied to the other. Here, the MEAs are, according to a preferred embodiment, located in the reactor in which the reaction mixture R is formed and the MEAs particularly preferably form at least part of the physical boundary of the reaction zone in which the reaction leading to the reaction mixture R takes place.

The reactions which lead to the hydrogen-comprising reaction mixtures R can either be reactions to which hydrogen is added at the beginning, for example to increase the life of the catalyst used in the reaction, or reactions in which hydrogen is formed as a reaction product.

According to the invention, the hydrogen-forming reaction leading to the reaction mixture R is preferably the dehydroaromatization of aliphatic hydrocarbons having from 1 to 4 carbon atoms. According to the invention, the feed stream E is in this case converted under nonoxidative conditions in the presence of a catalyst into a product stream P comprising aromatic hydrocarbons. The $C_1$-$C_4$-aliphatics comprised in the feed stream E react with dehydrogenation and cyclization to form the corresponding aromatics, with hydrogen being liberated.

The continuous removal of the hydrogen formed in the dehydrogenative aromatization from the interior of the reactor, i.e. the reaction zone, shifts the equilibrium of the reaction of a methane-comprising gas mixture to form aromatic hydrocarbons in the direction of the aromatic hydrocarbons. It is therefore possible to carry out the dehydrogenative aromatization at significantly lower temperatures, or to increase the methane conversion at a given temperature. Illustrative calculations carried out assuming that only benzene is formed indicate that 10.9% of methane is converted into benzene at 750° C. When 40% of the hydrogen formed is removed directly from the reaction zone, the reaction can be carried out at 679° C. for the same yield. Conversely, the methane conversion of 10.9 mol % can be increased to virtually 22 mol % when, at a reaction temperature of 750° C., 0.02 kg of $H_2$/kg of $CH_4$ of the 0.0206 kg of $H_2$/kg of $CH_4$ formed at equilibrium are removed electrochemically.

For the purposes of the present invention, nonoxidative in relation to the DHAM means that the concentration of oxidants such as oxygen or nitrogen oxides in the feed stream E is below 5% by weight, preferably below 1% by weight, particularly preferably below 0.1% by weight. The feed stream E is very particularly preferably free of oxygen. Particular preference is likewise given to a concentration of oxidants in the feed stream E which is equal to or less than the concentration of oxidants in the source from which the $C_1$-$C_4$-aliphatics originate.

According to the invention, the feed stream E comprises at least one aliphatic having from 1 to 4 carbon atoms. Such aliphatics include, for example, methane, ethane, propane, n-butane, i-butane, ethene, propene, 1- and 2-butene, isobutene. In one embodiment of the invention, the feed stream E comprises at least 50 mol %, preferably at least 60 mol %, particularly preferably at least 70 mol %, very particularly preferably at least 80 mol %, in particular at least 90 mol %, of $C_1$-$C_4$-aliphatics.

Among the aliphatics, particular preference is given to using saturated alkanes. Feed stream E then preferably comprises at least 50 mol %, preferably at least 60 mol %, particularly preferably at least 70 mol %, very particularly preferably at least 80 mol %, in particular at least 90 mol % of alkanes having from 1 to 4 carbon atoms.

Among the alkanes, preference is given to methane and ethane, in particular methane. In this embodiment of the present invention, the feed stream E preferably comprises at least 50 mol %, preferably at least 60 mol %, particularly preferably at least 70 mol %, very particularly preferably at least 80 mol %, in particular at least 90 mol %, of methane.

Natural gas is preferably used as source of the $C_1$-$C_4$-aliphatics. The typical composition of natural gas is as follows: from 75 to 99 mol % of methane, from 0.01 to 15 mol % of ethane, from 0.01 to 10 mol % of propane, up to 6 mol % of butane, up to 30 mol % of carbon dioxide, up to 30 mol % of hydrogen sulfide, up to 15 mol % of nitrogen and up to 5 mol % of helium. Before use in the process of the invention, the natural gas can be purified and enriched by methods known to those skilled in the art. Purification steps include, for example, the removal of any hydrogen sulfide or carbon dioxide and further compounds which are undesirable in the subsequent process which may be present in the natural gas.

The $C_1$-$C_4$-aliphatics comprised in the feed stream E can also originate from other sources, for example can have been obtained in the refining of petroleum. The $C_1$-$C_4$-aliphatics can also have been produced regeneratively (e.g. biogas) or synthetically (e.g. Fischer-Tropsch synthesis).

If biogas is used as $C_1$-$C_4$-aliphatics source, the feed stream E can additionally comprise ammonia, traces of lower alcohols and further components typical of biogas.

In a further embodiment of the process of the invention, LPG (liquefied petroleum gas) can be used as feed stream E. In another embodiment of the process of the invention, LNG (liquefied natural gas) can be used as feed stream E.

Hydrogen, steam, carbon monoxide, carbon dioxide, nitrogen and one or more noble gases can be additionally mixed into the feed stream E.

According to the invention, the DHAM is carried out in the presence of suitable catalysts. In general, it is possible to use all catalysts which catalyze the DHAM. The DHAM catalysts usually comprise a porous support and at least one metal applied thereto. The support usually comprises a crystalline or amorphous inorganic compound.

According to the invention, the catalyst preferably comprises at least one metallosilicate as support. Preference is given to using aluminum silicates as supports. Very particular preference is given according to the invention to using zeolites as supports. Zeolites are aluminum silicates which are usually obtained in the sodium form in their preparation. In the Na form, the excess negative charge present because of the replacement of 4-valent Si atoms by 3-valent Al atoms in the crystal lattice is compensated by Na ions. Instead of sodium alone, the zeolite can also comprise further alkali metal and/or alkaline earth metal ions to balance the charge. According to the invention, the at least one zeolite comprised in the catalysts preferably has a structure selected from among the structure types pentasil and MWW and is particularly preferably selected from among the structure types MFI, MEL, mixed structures of MFI and MEL and MWW. Very particular preference is given to using a zeolite of the ZSM-5 or MCM-22 type. The designations of the structure types of zeolites correspond to those given in W. M. Meier, D. H. Olson and Ch. Baerlocher, "Atlas of Zeolite Structure Types", Elsevier, 3rd edition, Amsterdam 2001. The synthesis of zeolites is known to those skilled in the art and can be carried out, for example, starting from alkali metal aluminate, alkali metal silicate and amorphous $SiO_2$ under hydrothermal conditions. Here, the type of channel system formed in the zeolite can be controlled via organic template molecules, via the temperature and further experimental parameters.

The zeolites can comprise further elements such as Ga, B, Fe or In in addition to Al.

The zeolites which are preferably used as supports are preferably used in the H form or the ammonium form, in which the zeolites are also commercially available.

In the conversion of the Na form into the H form, the alkali metal and/or alkaline earth metal ions comprised in the zeolite are replaced by protons. A customary process which is preferred according to the present invention for conversion of the catalysts into the H form is a two-stage process in which the alkali metal and/or alkaline earth metal ions are firstly replaced by ammonium ions. On heating the zeolite to about 400-500° C., the ammonium ion decomposes into volatile ammonia and the proton which remains in the zeolite.

For this purpose, the zeolite is treated with an $NH_4$-comprising mixture. As $NH_4$-comprising component of the $NH_4$-comprising mixture, use is made of an ammonium salt selected from the group consisting of ammonium chloride, ammonium carbonate, ammonium hydrogencarbonate, ammonium nitrate, ammonium phosphate, ammonium acetate, ammonium hydrogenphosphate, ammonium dihydrogenphosphate, ammonium sulfate and ammonium hydrogensulfate. Preference is given to using ammonium nitrate as $NH_4$-comprising component.

The treatment of the zeolite with the $NH_4$-comprising mixture is carried out by the known methods suitable for ammonium exchange of zeolites. These include, for example, impregnation, dipping or spreading of the zeolite with an ammonium salt solution, with the solution generally being employed in excess. As solvents, preference is given to using water and/or alcohols. The mixture usually comprises from 1 to 20% by weight of the $NH_4$ component used. The treatment with the $NH_4$-comprising mixture is usually carried out over a period of several hours and at elevated temperatures. After the $NH_4$-comprising mixture has acted on the zeolite, excess mixture can be removed and the zeolite can be washed. The zeolite is subsequently dried at from 40 to 150° C. for a number of hours, usually from 4 to 20 hours. This is followed by calcination of the zeolite at temperatures of from 300 to 700° C., preferably from 350 to 650° C. and particularly preferably from 500 to 600° C. The calcination time is usually from 2 to 24 hours, preferably from 3 to 10 hours, particularly preferably from 4 to 6 hours.

In a preferred embodiment of the present invention, zeolites which have been treated again with an $NH_4$-comprising mixture and subsequently dried are used as supports. The renewed treatment of the zeolites with the $NH_4$-comprising mixture is carried out according to the above description.

Commercially available zeolites in the H form usually have already undergone a first ammonium exchange by treatment with an $NH_4$-comprising mixture with subsequent drying and calcination. Commercially procured zeolites which are present in the H form can therefore be used according to the invention as support a), but they are preferably subjected to renewed treatment with an $NH_4$-comprising mixture and, if appropriate, calcined.

The DHAM catalyst usually comprises at least one metal. The metal is usually selected from groups 3 to 12 of the Periodic Table of the Elements (IUPAC). According to the invention, the DHAM catalyst preferably comprises at least one metal selected from among the transition metals of transition groups 5 to 11. The DHAM catalyst particularly preferably comprises at least one metal selected from the group consisting of Mo, W, Mn, Tc, Re, Fe, Ru, Os, Co, Rh, Ir, Ni, Pd, Pt, Cu, Cr, Nb, Ta, Ag and Au. In particular, the DHAM catalyst comprises at least one metal selected from the group consisting of Mo, W, Re, Fe, Ru, Os, Co, Rh, Ir, Ni, Pd, Pt, Cu. The DHAM catalyst very particularly preferably comprises at least one metal selected from the group consisting of Mo, W and Re.

It is likewise preferred according to the invention for the DHAM catalyst to comprise at least one metal as active component and at least one further metal as dopant. The active component is, according to the invention, selected from among Mo, W, Re, Ru, Os, Rh, Ir, Pd, Pt. The dopant is, according to the invention, selected from the group consisting of Cr, Mn, Fe, Co, Nb, Ta, Ni, Cu, V, Zn, Zr and Ga, preferably from the group consisting of Fe, Co, Nb, Ta, Ni, Cu and Cr. According to the invention, the DHAM catalyst can comprise more than one metal as active component and more than one metal as dopant. These are each selected from among the metals indicated for the active component and the dopant. The catalyst preferably comprises one metal as active component and one or two metals as dopant.

The at least one metal is, according to the invention, applied wet-chemically or dry-chemically to the support by methods known to those skilled in the art.

In wet chemical methods, the metals are applied in the form of aqueous, organic or organic-aqueous solutions of their salts or complexes by impregnating the support with the corresponding solution. Supercritical $CO_2$ can also serve as solvent. The impregnation can be carried out by the incipient wetness method in which the porous volume of the support is filled with an approximately equal volume of impregnation solution and, if appropriate after aging, the support is dried. It is also possible to employ an excess of solution, in which case the volume of this solution is greater than the porous volume of the support. Here, the support is mixed with the impregnation solution and stirred for a sufficient time. It is also possible to spray the support with a solution of the appropriate metal compound. Other production methods known to those skilled in the art, e.g. precipitation of the metal compounds on the support, spraying-on of a solution comprising metal compound, sol impregnation, etc., are also possible. After application of the at least one metal to the support, the catalyst is dried under reduced pressure or in air at about 80-130° C., usually for from 4 to 20 hours.

According to the invention, the at least one metal can also be applied by a dry-chemical method, for example by depositing gaseous metal carbonyls such as $Mo(CO)_6$, $W(CO)_6$ and $Re_2(CO)_{10}$ from the gas phase onto the support at relatively high temperatures. The deposition of the metal carbonyl compound is carried out after calcination of the support. It can also be mixed in the form of a fine powder, for example as carbide, with the support.

According to the invention, the catalyst comprises from 0.1 to 20% by weight, preferably from 0.2 to 15% by weight, particularly preferably from 0.5 to 10% by weight, in each case based on the total weight of the catalyst, of the at least one metal. The catalyst can comprise only one metal; it can also comprise a mixture of two, three or more metals. The metals can be applied together in one solution by wet-chemical means or in different solutions in succession with drying steps between the individual applications. The metals can also be applied in mixed form, i.e. one part can be applied wet-chemically and another part dry-chemically. If necessary, the support can be calcined as described above between the applications of the metal compounds.

According to the invention, the catalyst can comprise at least one metal from the group of active components in combination with at least one metal selected from the group of dopants. In this case, the concentration of the active component is from 0.1 to 20% by weight, preferably from 0.2 to 15% by weight, particularly preferably from 0.5 to 10% by weight, in each case based on the total weight of the catalyst. The dopant is in this case present in the catalyst in a concentration of, according to the invention, at least 0.1% by weight, preferably at least 0.2% by weight, very particularly preferably at least 0.5% by weight, based on the total weight of the catalyst.

In a further preferred embodiment of the present invention, the catalyst is mixed with a binder. Suitable binders are the customary binders known to those skilled in the art, e.g. binders comprising aluminum oxide and/or Si. Particular preference is given to Si-comprising binders, with tetraalkoxysilanes, polysiloxanes and colloidal $SiO_2$ sols being particularly useful.

According to the invention, addition of the binder is followed by a shaping step in which the catalyst composition is processed by methods known to those skilled in the art to produce shaped bodies. As shaping processes, mention may be made by way of example of spraying of a suspension comprising the support a) or the catalyst composition, spray drying, tableting, pressing in the moist or dry state and extrusion. Two or more of these processes can also be combined. Auxiliaries such as pore formers and pasting agents or other additives known to those skilled in the art can be used for shaping. Possible pasting agents are compounds which lead to an improvement in the mixing, kneading and flow properties. These are preferably, for the purposes of the present invention, organic, in particular hydrophilic polymers such as cellulose, cellulose derivatives such as methylcellulose, starch such as potato starch, wallpaper paste, acrylates, polyacrylates, polymethacrylates, polyvinyl alcohols, polyvinylpyrrolidone, polyisobutylene, polytetrahydrofuran, polyglycol ethers, fatty acid compounds, wax emulsions, water or mixtures of two or more of these compounds. As pore formers, mention may be made for the purposes of the present invention of, for example, compounds which can be dispersed, suspended or emulsified in water or aqueous solvent mixtures, e.g. polyalkylene oxides, polystyrene, polyacrylates, polymethacrylates, polyolefins, polyamides, polyesters, carbohydrates, cellulose, cellulose derivatives such as methylcellulose, natural sugar fibers, pulp, graphite or mixtures of two or more of these compounds. Pore formers and/or pasting agents are preferably removed from the shaped body obtained after shaping by means of at least one suitable drying and/or calcination step. The conditions required for this purpose can be selected in a manner analogous to the parameters described above for calcination and are known to those skilled in the art.

Particularly for use as fluidized-bed catalysts, the shaped catalyst bodies are produced by means of spray drying.

The geometry of the catalysts which can be obtained according to the invention can be, for example, spherical (hollow or solid), cylindrical (hollow or solid), ring-, saddle-, star-, honeycomb- or tablet-shaped. Furthermore, extrudates having the shape of, for example, rods, trilobes, quatrolobes, stars or hollow cylinders are possible. The catalyst composition to be shaped can also be extruded, calcined and the extrudates obtained in this way can be crushed and processed to give crushed material or powder. The crushed material can be separated into various sieve fractions.

In a preferred embodiment of the invention, the catalyst is used as shaped bodies or crushed material.

In a further preferred embodiment, the catalyst is used as powder. The catalyst powder can comprise binders, but can also be free of binders.

If the catalyst according to the invention comprises a binder, the latter is present in a concentration of from 5 to 80% by weight, based on the total weight of the catalyst, preferably from 10 to 50% by weight, particularly preferably from 10 to 30% by weight.

It can be advantageous to activate the catalyst used for the dehydroaromatization of $C_1$-$C_4$-aliphatics before the actual reaction.

This activation can be carried out using a $C_1$-$C_4$-alkane such as ethane, propane, butane or a mixture thereof, preferably butane. The activation is carried out at a temperature of from 250 to 850° C., preferably from 350 to 650° C., and a pressure of from 0.5 to 5 bar, preferably from 0.5 to 2 bar. The GHSV (gas hourly space velocity) in the activation is usually from 100 to 4000 $h^{-1}$, preferably from 500 to 2000 $h^{-1}$.

However, it is also possible to carry out an activation by the feed stream E per se already comprising the $C_1$-$C_4$-alkane or a mixture thereof or by adding the $C_1$-$C_4$-alkane or a mixture thereof to the feed stream E. The activation is carried out at a temperature of from 250 to 650° C., preferably from 350 to 550° C., and a pressure of from 0.5 to 5 bar, preferably from 0.5 to 2 bar.

In a further embodiment, it is also possible to add hydrogen in addition to the $C_1$-$C_4$-alkane.

In a preferred embodiment of the present invention, the catalyst is activated by means of a gas stream which comprises $H_2$ and can additionally comprise inert gases such as $N_2$, He, Ne and Ar.

According to the invention, the dehydroaromatization of $C_1$-$C_4$-aliphatics is carried out in the presence of a catalyst at temperatures of from 400 to 1000° C., preferably from 500 to 900° C., particularly preferably from 600 to 800° C., in particular from 700 to 800° C., at a pressure of from 0.5 to 100 bar, preferably from 1 to 30 bar, particularly preferably from 1 to 10 bar, in particular from 1 to 5 bar. According to the present invention, the reaction is carried out at a GHSV (gas hourly space velocity) of from 100 to 10 000 $h^{-1}$, preferably from 200 to 3000 $h^{-1}$.

According to the invention, the catalyst can be used undiluted or mixed with inert material. The inert material can be any material which is inert, i.e. does not react, under the reaction conditions prevailing in the reaction zones. A suitable inert material is in particular the undoped support used for the catalyst but can also be an inert zeolite, aluminum oxide, silicon dioxide, etc. The particle size of the inert material is in the region of the size of the catalyst particles.

According to the present invention, the undiluted catalyst or catalyst mixed with inert material is preferably present as a fixed, moving or fluidized bed. The catalyst or the mixture of catalyst and inert material is particularly preferably present as a fluidized bed.

The catalyst used in the DHAM is, in one embodiment of the invention, regenerated regularly. The regeneration can be carried out by the customary processes known to those skilled in the art. According to the invention, the regeneration is preferably carried out under reducing conditions by means of a gas stream comprising hydrogen.

The regeneration is carried out at temperatures of from 600° C. to 1000° C. and particularly preferably from 700° C. to 900° C. and pressures of from 1 bar to 30 bar, preferably from 1 bar to 15 bar and particularly preferably from 1 to 10 bar.

The $C_1$-$C_4$-aliphatics are, according to the invention, converted into aromatics with liberation of $H_2$. The product stream P therefore comprises at least one aromatic hydrocarbon selected from the group consisting of benzene, toluene, ethylbenzene, styrene, xylene and naphthalene. It particularly preferably comprises benzene and toluene. The product stream further comprises unreacted $C_1$-$C_4$-aliphatics, hydrogen which has been formed and the inert gases such as $N_2$, He, Ne, Ar comprised in the feed stream E, substances such as $H_2$ which have been added to the feed stream E and impurities originally present in the feed stream E.

The invention claimed is:

1. A process for electrochemical separation of hydrogen from a hydrogen-comprising reaction mixture R, the method comprising:
    contacting the hydrogen-comprising reaction mixture R with a gastight membrane-electrode assembly comprising at least one selectively proton-conducting membrane and at least one electrode catalyst on each side of the membrane,
    wherein at least part of the hydrogen present in the reaction mixture R is oxidized to protons over an anode catalyst on a retentate side of the membrane and the protons are, after passing through the membrane to a permeate side, at least one of
    (I) reduced to hydrogen over a cathode catalyst, and
    (II) reacted with oxygen over a cathode catalyst to form water, with oxygen originating from an oxygen-comprising stream O which is brought into contact with the permeate side of the membrane.

2. The process of claim 1, wherein the reaction mixture R originates from a hydrogen-forming reaction.

3. The process of claim 1, wherein the hydrogen is separated off directly from a reaction zone in which the reaction mixture R is formed.

4. The process of claim 1, wherein the hydrogen is separated off from the reaction mixture R while a reaction leading to the reaction mixture R is taking place.

5. The process of claim 1, wherein the hydrogen is separated off according to both (I) and (II) and at least part of the stream produced in (II) is employed in (I).

6. The process of claim 1, wherein, when the hydrogen is separated off according to (II), at least part of any heat evolved in (II) is introduced into a reaction zone.

7. The process of claim 1, wherein the hydrogen is separated off according to (I) with application of a voltage of from 0.05 to 2000 mV relative to a hydrogen reference electrode.

8. The process of claim 1, wherein the oxygen-comprising stream O comprises at least 15 mol % of oxygen.

9. The process of claim 1, wherein the oxygen-comprising stream O comprises air.

10. The process of claim 1, wherein electrodes of the membrane-electrode assembly are configured as gas diffusion electrodes.

11. The process of claim 1, wherein a ceramic membrane is employed as the selectively proton-conducting membrane.

12. The process of claim 1, wherein the hydrogen is separated off at from 200 to 1200° C.

13. The process of claim 2, wherein the hydrogen-forming reaction is a nonoxidative dehydroaromatization of at least one aliphatic hydrocarbon comprising from 1 to 4 carbon atoms.

14. The process of claim 2, wherein the hydrogen is separated off directly from a reaction zone in which the reaction mixture R is formed.

15. The process of claim 2, wherein the hydrogen is separated off from the reaction mixture R while a reaction leading to the reaction mixture R is taking place.

16. The process of claim 2, wherein the hydrogen is separated off according to both (I) and (II) and at least part of the stream produced in (II) is employed in (I).

17. The process of claim 3, wherein the hydrogen is separated off according to both (I) and (II) and at least part of the stream produced in (II) is employed in (I).

18. The process of claim 4, wherein the hydrogen is separated off according to both (I) and (II) and at least part of the stream produced in (II) is employed in (I).

19. The process of claim 2, wherein, when the hydrogen is separated off according to (II), at least part of any heat evolved in (II) is introduced into a reaction zone.

\* \* \* \* \*